UNITED STATES PATENT OFFICE.

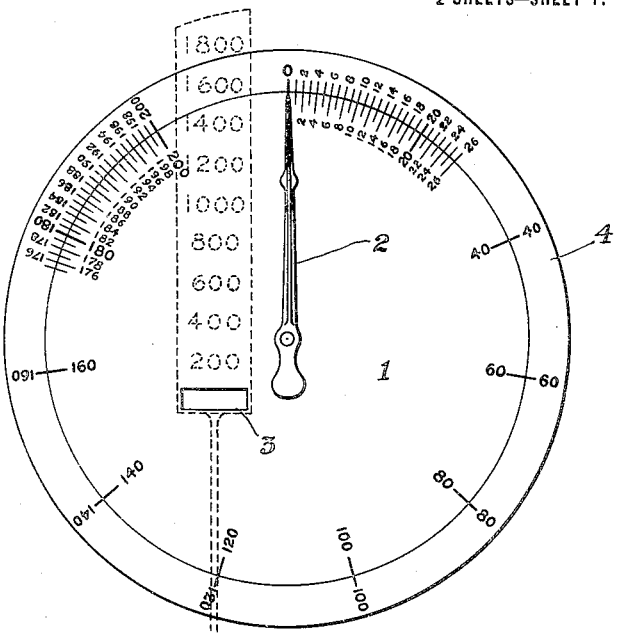

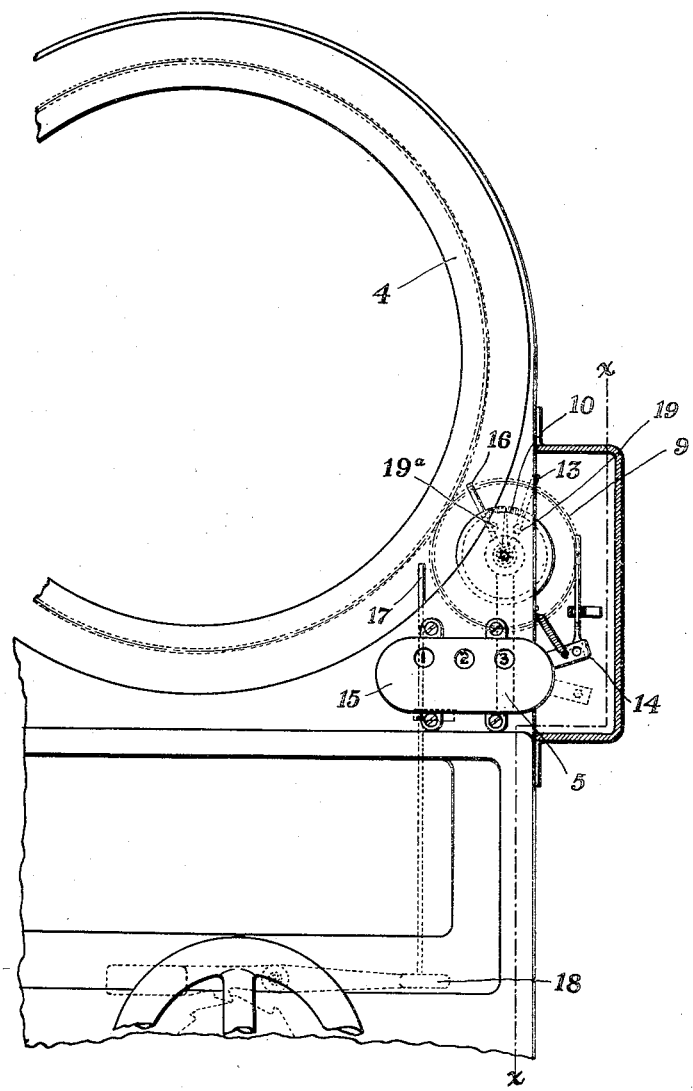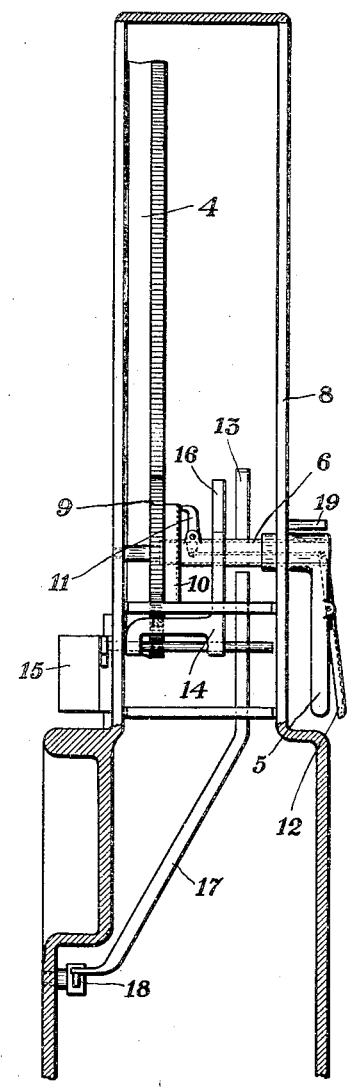

BENNIAH H. WINTERS AND NELSON C. MASSEY, OF SPRINGFIELD, OHIO, ASSIGNORS TO THE WINTERS-COLEMAN SCALE COMPANY, OF SPRINGFIELD, OHIO, A CORPORATION OF OHIO.

WEIGHING-MACHINE.

1,225,387.  Specification of Letters Patent.  Patented May 8, 1917.

Application filed December 21, 1914. Serial No. 878,339.

*To all whom it may concern:*

Be it known that we, BENNIAH H. WINTERS and NELSON C. MASSEY, citizens of the United States, residing at Springfield, in the county of Clark and State of Ohio, have invented certain new and useful Improvements in Weighing-Machines, of which the following is a specification.

This invention relates to that type of dial scale having a wide range of capacity from graduating unit to maximum capacity, and with only a fraction of said capacity represented by dial graduations, provision being made for additional capacity up to maximum.

In weighing package commodities, or two or more grades of the same commodity, on scales of said type, it is frequently convenient and economical to accumulate two or more commodities, or two or more grades of the same commodity, on the scale platform at the same time, and to determine the individual weight of each commodity or grades as well as the total weight up to maximum capacity. Also to determine the total weight and individual weights of a number of loads successively weighed but not accumulated on the scale platform, up to an unlimited capacity.

There is here disclosed a combination of a stationary and revolving dial with graduations thereon, adapted to a scale of said type, by means of which the individual and total weights of accumulated loads can be indicated up to the maximum capacity, and the total and individual weights of non-accumulated loads can be indicated up to an unlimited capacity.

In the drawings,

Figure 1 is a front view in the elevation.

Fig. 2 is a detail of the revolving dial.

Fig. 3 shows front view of manual means for moving revolving dial a predetermined amount in advancing or reverse direction.

Fig. 4 shows a sectional view on line x—x of Fig. 3 with casing 8 removed.

The general mechanism of the weighing machine is the same as that set forth and described in the patent of H. B. Osgood No. 1,125,874, issued January 19, 1915, and patent of L. A. Osgood, No. 1,159,412, issued November 9, 1915, and contemplates the use of a stationary dial in all respects substantially the same as that set forth and described in that application, but there is combined with said stationary dial the rotatably mounted dial to be operated in a manner hereinafter described.

There is designated the usual stationary dial by the figure 1, and the pointer of the indicating device is designated by 2, while at 3 there is the usual indicator for supplemental counterbalances that are applied to the scale when the load or accumulated loads weigh more than the initial capacity of the dial, which, in the drawings, is 200#, the maximum capacity being 2,000#, the maximum p. weight indication being 1800. The movable dial is indicated by 4.

The fundamental principle employed is in graduating stationary and rotatably mounted dials so that they will be capable of use with the supplemental counterbalance device. This is accomplished by all being graduated in multiples or fractions of 10.

The gist of the invention consists in so graduating and mounting the fixed and movable dials that the combination can be employed to indicate the weight of accumulated and non-accumulated loads, whether the total weight is within or beyond initial dial capacity, and the combination is such that the weighing of individual loads in the ordinary manner anywhere within the capacity of the scale will not be interfered with.

To this end, the revolving dial is graduated to correspond to the stationary dial, and means are provided for automatically regulating the extent of movement of the dial, when necessary, as hereinafter explained.

Crank arm 5, (Fig. 4) is attached to shaft 6, pivoted in case 8. Gear wheel 9 is always in mesh with gears cut on revolving dial 4, and is loosely carried on shaft 6. Wheel 9 is also formed with clutch gear 10. Clutch 11 is pivotally mounted on a part of shaft 6 and is operated by lever 12 and connections secured to the tail of the clutch. Trip arm 13 fastened to shaft 6, contacts against the upper end of trip rod 17 to trip lever 18, which corresponds with the trip lever shown and fully explained in said patents, and trip arm 16 fastened to shaft 6 coöperates in the same way with trip rod 14 to actuate register 15. The arm 5 returns to normal by gravity.

Preferably the parts are arranged such that the operator by grasping the handle or arm 5 and rotating same toward the right until arrested by stop 19 will cause the movable dial to advance a predetermined amount equal to the blank or ungraduated space appearing on the face of the dial and when the handle is reversely rotated until it is arrested by fixed stop 19ª the dial will be retracted a predetermined amount, viz., the amount of the blank space.

To indicate the individual weights of two or more loads accumulated on the scale platform, and at the same time the total weight thereof the operation is as follows, using for illustration the dial shown by Fig. 1 which has an initial capacity of 200 lbs., the total accumulated capacity being 2,000#.

The pointer will indicate on the stationary dial the weight of the first load, which we will assume was 50 lbs. Move the revolving dial 4 so that its zero (0) comes opposite the pointer. Assuming that the second load weighs 140 lbs., the pointer will indicate the total weight of 190 lbs. on the stationary dial, and the individual weight of 140 lbs. on the revolving dial. For weighing the third load of an assumed weight of 80 lbs., the revolving dial must be again moved until its zero (0) is opposite the hand. When the third load has been applied, the pointer will pass into the blank or ungraduated space on fixed dial, giving notice that the initial dial capacity has been exceeded. Having such notice, the operator will then throw arm 5 to stop at the right. As a result, counterpoise equivalent to 200 lbs. will be added; the poise indicator will so indicate in figures through the opening in the dial; the revolving dial will be turned (advanced) as explained above, and the pointer will be found indicating 70 on the stationary dial, which, plus the p. weight indication, will be the total weight of 270 lbs., and also the pointer will indicate 80 on the revolving dial as the individual weight of the third load. This operation can be continued and individual and total weights correctly indicated up to the capacity of scale.

To indicate the total weight of a number of non-accumulated loads, the operation is as follows, using the same loads as above for illustration.

The pointer will indicate the weight of the first load, 50 lbs. on the stationary dial. Move the revolving dial so that its 50 graduation comes opposite the zero (0) of stationary dial. When the first load has been removed, the pointer will go back to zero (0) or empty balance on the stationary dial. When the second load, 140 lbs., has been applied, the pointer will indicate its weight on the stationary dial and the total weight of both loads, 190 lbs., on the revolving dial. For weighing the third load, move the revolving dial so as to bring total weight indication thereon 190, opposite the zero (0) on stationary dial. It is apparent that when the movable dial is so arranged that the figure 190 thereon is opposite the zero mark on the stationary dial, the blank space on the movable dial will extend from a point marked 10 on the stationary dial to the point 30 on the stationary dial and consequently if nothing is done, the pointer will pass over the blank space on the movable dial in passing from the zero point on the stationary dial to the indicating point 70 and consequently there will be a discrepancy between the total indication on the movable dial due to the indicator passing over a blank space and in order to overcome that error the movable indicator is arranged to be moved backwardly the distance of the blank space so as to take care of that error. When the third load, 80 lbs. has been applied, the pointer will indicate its weight on the stationary dial, but in doing so it will pass through the blank space on the revolving dial, giving notice that the capacity of the revolving dial has been exhausted. Having this notice, the operator will throw arm 5 to stop 19 at the left. As a result, the dial will be moved (backward) a distance equal to the blank space; also, at the same time, the counter 15 will be actuated and register 1, each register so made representing a weight equal to dial capacity, in this example, 200 lbs. The pointer will now be found indicating 70 on the revolving dial which, plus the register count equal to 200 lbs., represents the total weight, 270 lbs., of the three loads.

The above operation may be continued indefinitely, and the total weight of loads passing over the scale determined by noting the register count, multiplying by the dial capacity and adding the last indication on the revolving dial.

Having thus described our invention, we claim:

1. The combination of an indicator dial graduated to indicate amounts or weights of initial dial capacity, a supplemental indicator dial associated therewith having graduations corresponding to said first dial, one of said indicator dials being arranged to indicate the presence of a load greater than initial dial capacity, and means for moving one dial relatively to the other a predetermined fixed distance whenever the presence of said last mentioned load is indicated.

2. The combination of an indicator dial with graduated spaces for indicating loads of initial dial capacity and having a supplemental and additional ungraduated space for loads greater than said initial capacity, a supplemental indicator dial associated therewith having graduated spaces corresponding to said first dial, and means for retracting one of said dials to the extent of said supplemental space, substantially as specified.

3. The combination of an indicator dial with graduated spaces for loads of initial dial capacity and a supplemental space for loads greater than that, a supplemental indicator dial associated therewith and graduated correspondingly to the first dial, and means for moving one dial in its relation to the other a predetermined fixed distance equal to said supplemental space, for the purpose specified.

4. The combination of an indicator dial graduated to indicate loads of initial dial capacity and having a supplemental space for indicating the presence of loads greater than that, a supplemental indicator dial associated therewith and graduated correspondingly to the first dial, an indicator for indicating counterbalances, and means for moving one of said dials a predetermined distance equal to said supplemental space, substantially as specified.

5. The combination of an indicator dial graduated for loads of initial capacity and having a supplemental space for loads exceeding dial capacity, a supplemental indicator dial associated therewith having graduated spaces corresponding to the graduated spaces of the first dial, and means for advancing and retracting said supplemental dial a fixed amount equal to said supplemental space, for the purpose specified.

6. The combination of an indicator dial graduated to indicate loads of initial dial capacity and having a supplemental ungraduated space for loads greater than said initial dial capacity, a supplemental dial associated therewith having graduated spaces corresponding to those on the first dial, means for moving one of said dials a fixed distance equal to said supplemental space, a counting register, and means connecting said register whereby the same will be operated whenever said supplemental dial is moved in one direction, for the purpose specified.

In testimony whereof, we have hereunto set our hands this 17th day of December, 1914.

BENNIAH H. WINTERS.
NELSON C. MASSEY.

Witnesses:
 Chas. I. Welch,
 Effa M. Smith.